United States Patent Office.

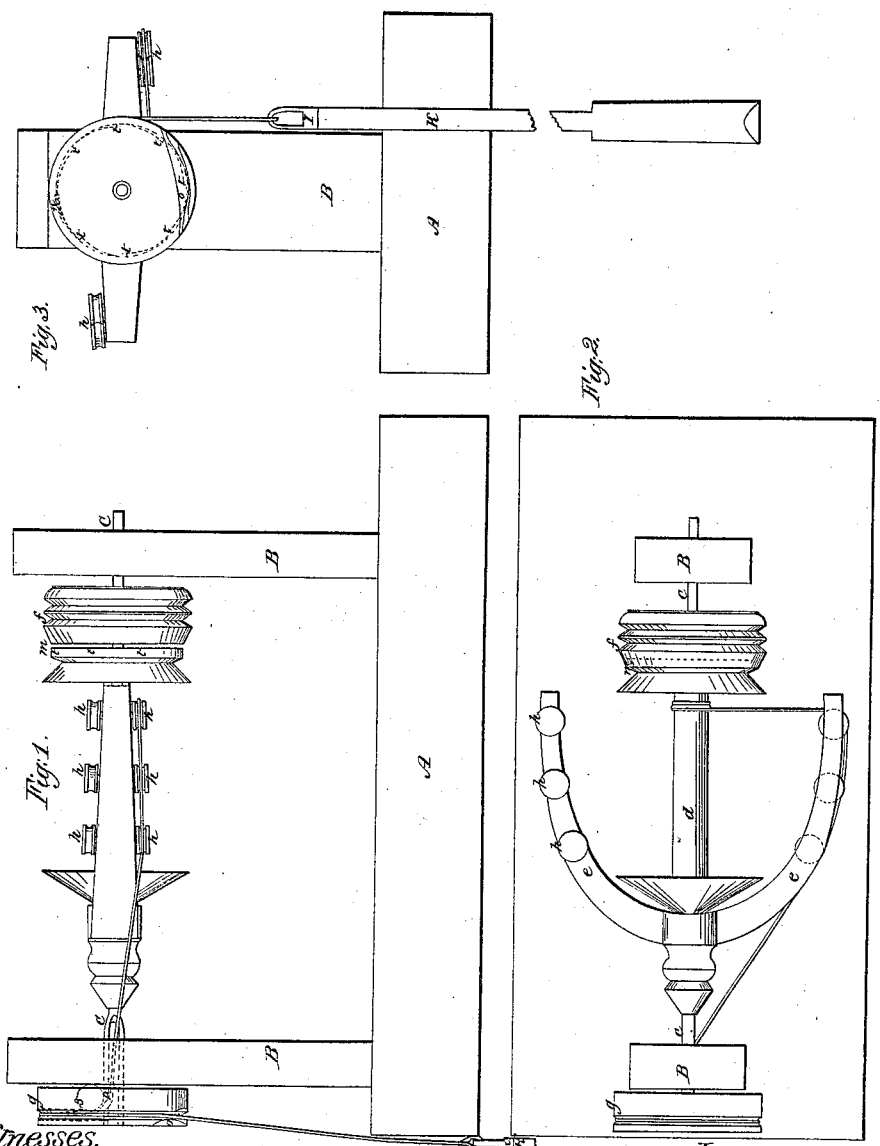

IMPROVEMENT IN STONE DRILLS.

THOMAS WOODS, OF JESSAMINE COUNTY, KENTUCKY.

Letters Patent No. 60,314, dated December 4, 1866.

SPECIFICATION.

TO ALL WHOM IT MAY CONCERN:

Be it known that I, THOMAS WOODS, of Jessamine county, in the State of Kentucky, have invented certain new and useful improvements in Drills; and I hereby declare that the following is a true, full, and exact description of the same, reference being had to the accompanying drawings and to the letters of reference marked thereon.

Figure 1, in the annexed drawings, represents a side elevation of the drill frame.

Figure 2 is a plan view of the flyers and pulleys.

Figure 3 is an end elevation of the frame.

The letter A, fig. 1, represents the sill of my frame, and B the two uprights. C designates a spindle, occupying a horizontal position, and having its bearings in the uprights B. On the spindle C is fitted the spool $d$, the flyers $e$, and the pulleys $f$ and $g$. The flyers $e$ are supplied with a series of small pulleys, $h$, the use of which will be hereinafter explained. The pulley $f$ has a circular cavity at its inner surface, the depth of which is indicated by dotted lines in fig. 2. To the end of spool $d$, next to $f$, is a disk $m$, made solid with the end of spool $d$, and made to fit in the cavity in $f$, from which it can be withdrawn at pleasure. On the periphery of disk $m$ there is a series of indentations $t$, and on the inner circumference of the cavity in $f$ is placed a small metal spring $n$, (see in dotted lines fig. 3,) which will catch in the indentations $t$ when it is required to keep the spool in motion. K represents a drill, having a swivel, $i$, at the upper end. To swivel $i$ the cord is attached that operates the drill K. The upper end of the cord is fastened to the spool $d$. The remaining part of the cord first passes through the eye of the spindle, as seen in fig. 1, and passes out of the spindle through a slot, P, near its end, and enters an opening near the centre of $g$, then passes over the small pulley, $s$, on the inner surface of $g$, (see dotted lines, fig. 1,) and comes out in the groove which is cut in $g$. The cord is then fastened to drill K, and its length adapted to the work to be performed. On one portion of the circumference of pulley $g$ a bevel $o$ is formed, extending from the groove in which the cord runs to the face of pulley $g$ once in each revolution of $g$. In order that a complete rotation of my drill may be prevented when passing through water, and thus change the point of impact, I widen its lower or bevel portion, so that the resistance of the water will prevent its getting a circular motion. The swivel at the upper end of the drill shank will hinder the cord attached to it from getting twisted around the drill shank.

The advantage of my drill is that the work can be performed by power—this power is obtained by the use of a band which passes over pulley $g$, and thence over a drum put in motion by any agency in common use—in place of being done by hand, the labor of one person only being required to operate the machine, driving the heaviest drill. The operator will place himself opposite to pulley $f$, so as to regulate the feed motion, which is done by the friction of the hand when applied to the circumference of disk $m$, and disengaging it from spring $s$, and restoring it again, as the case may demand. It will be observed that the cord passes from spool $d$ to one of the pulleys $h$ on flyers $e$ before it enters the eye of the spindle C, as above described.

I do not claim to have invented either the spinning flyers or the rock drill, but I limit my claim to the improvement and combination of them so as to produce all the motions necessary for the operation of the drill as hereinabove described.

1. I claim the eye for the drill rope, passing from the ordinary eye of the spindle, in front of the bearing, through the side of the spindle, and then through the pulley, in the line of the radius, to the groove on the circumference, as described.

2. I claim also the arrangement of the ratchet wheel and pawl on the spool and spindle, in combination with the band wheel $g$ on the spool, for the purpose of producing the feed motion of the drill, as herein described.

3. I claim also the arrangement of the small pulleys on the arms of the flyers, and the pulley at the eye for the rope.

4. I claim the combination of the flyers, the drill, and the other improvements, as herein described.

In testimony that I claim the foregoing as my own, I hereby affix my signature, in the presence of two witnesses.

THOMAS WOODS.

Witnesses:
ROBERT J. GWYN,
WM. P. MCCAULEY.